W. P. STALCUP.
CULTIVATOR.
No. 180,438.
2 Sheets—Sheet 2.
Patented Aug. 1, 1876.
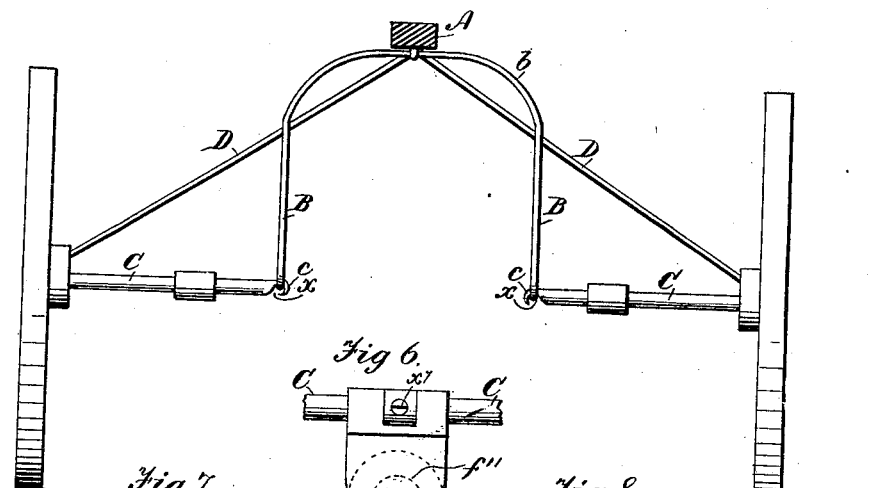
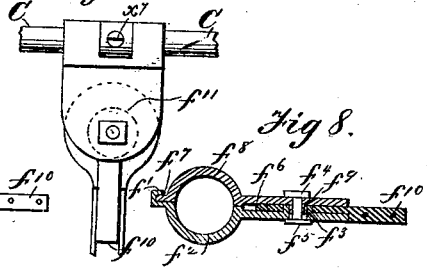
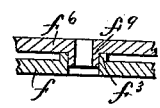
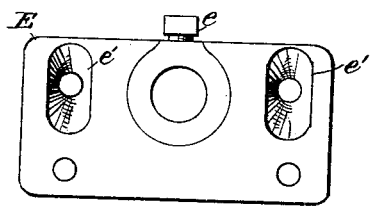
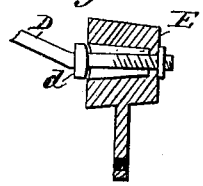
Witnesses;
Harry C. Clark
James J. Finley
Inventor.
William P. Stalcup.
by H. W. Beadle & Co
attys.

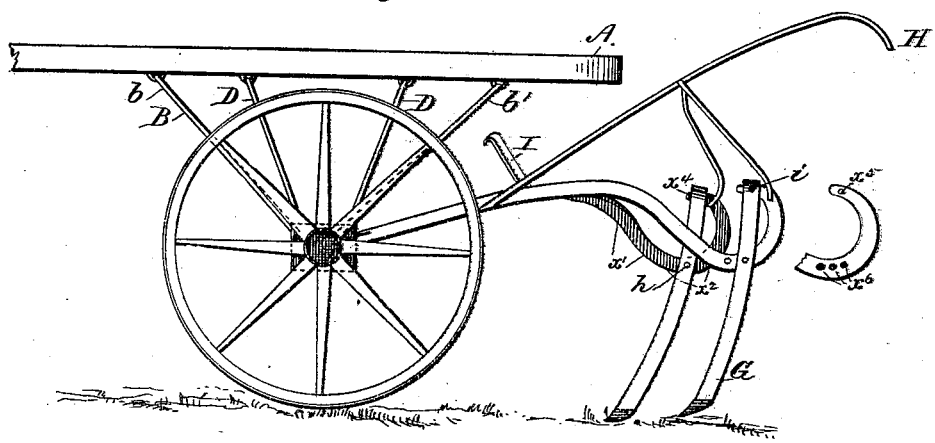
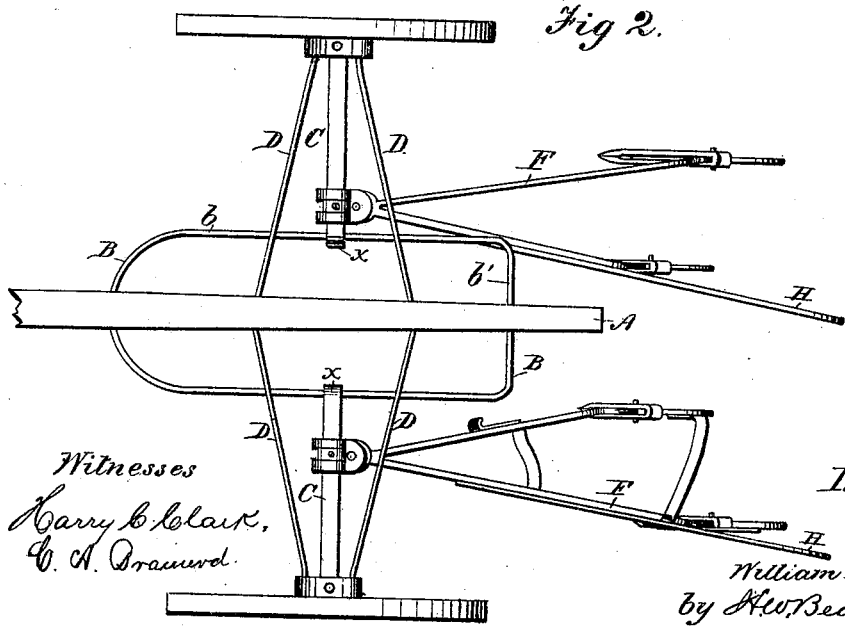

UNITED STATES PATENT OFFICE.

WILLIAM P. STALCUP, OF BROOKVILLE, INDIANA, ASSIGNOR TO HIMSELF, WILLIAM A. LINDSAY AND JOHN W. REYNOLDS, OF SAME PLACE.

IMPROVEMENT IN CULTIVATORS.

Specification forming part of Letters Patent No. 180,438, dated August 1, 1876; application filed June 15, 1875.

*To all whom it may concern:*

Be it known that I, WILLIAM P. STALCUP, of Brookville, in the county of Franklin and State of Indiana, have invented a new and useful Improvement in Cultivators; and I do hereby declare that the following is a full and exact description of the same, reference being had to the accompanying drawings, and to the letters of reference marked thereon.

This invention consists, first, in the combination of hinged axles with the arch D of the frame, and certain blocks E; and, second, in the combination of a hinged axle, fixed at its inner end, with a supporting-socket at its outer end, adapted to permit vertical movement, as will be fully described hereinafter.

In the drawings, Figure 1 represents a side elevation of my improved cultivator; Fig. 2, a plan view; Fig. 3, a front elevation without the cultivator-beams; Figs. 4 and 5, front and sectional views of the blocks E; Figs. 6, 7, and 8, various views of the coupling-iron uniting the cultivator-beams to the axle; and Fig. 9, a front view of one of the shovel-sheaths.

To enable others skilled in the art to make and use my invention, I will now proceed to describe its construction and manner of operation.

A represents the pole of the cultivator, which forms also the main beam of the machine, as shown. B represents a rod of suitable size and length, which is united at its ends, and bent to form the arches $b\ b'$, having a common base at the points $x\ x$, as shown. These arches are connected at their base points to the inner ends of the independent axles, as shown in Fig. 3, and strongly secured at their crown points to the main beam. Their position and shape are such that they are adapted to strongly unite the parts and secure them against longitudinal strain, and at the same time leave a clear space in the center to avoid interference with the corn or other growing crops under cultivation. C C represent independent axles, each consisting simply of a rod of suitable size and length, which is provided with screw-threads or a linchpin at its outer end, and with a hook, $c$, at its inner end, which latter is adapted to be caught over the base points $x\ x$ of the arches $b\ b'$, as shown in Fig. 3. D D represent frame-rods centrally secured to the beam A, between the arches $b\ b'$, the ends of which are bent in converging lines and extended through the blocks E upon the axle, as shown in Fig. 2. Each end is provided with a proper bearing-shoulder and loose collar, $d$, Fig. 5, and also with screw-threads, by means of which and a proper nut it is strongly secured to the block, as shown in Fig. 5. If desired, a single central arch-rod may be employed; but two are preferred as being better adapted to resist strain. E, Figs. 2, 4, and 5, represents a casting or block, provided with a central orifice adapted to receive the axle, a vertical threaded opening and corresponding set-screw, $e$, adapted to secure the block when adjusted at its proper place upon the axle, and two lateral openings, $e'\ e'$, of conical form, converging from within outward, adapted to receive the ends of the rods D, as shown. F F represent the cultivator-beams, the front ends of which may be secured to the axles in any well-known or approved manner. The specific mechanism preferred, however, is represented in Figs. 6, 7, and 8, in which $f$ represents the lower plate, having the hook $f^1$, semicircular recess $f^2$, and opening, with surrounding sleeve $f^3$, as shown. $f^6$ represents the cap or upper plate, having the tongue $f^7$, semicircular recess $f^8$, and opening, with surrounding sleeve $f^9$, which is adapted to fit snugly within the sleeve $f^3$, as shown. $f^{10}$ represents a plate having opening $f^{11}$, adapted to fit over the sleeve $f^3$, as shown, to which the front ends of the cultivator-beams are bolted, as shown. $f^4\ f^5$ represent the bolt and nut by means of which the parts are secured together. These cultivator-beams are formed of flat metal, and at their rear ends are bent into hook shape for the purpose of obtaining the curvatures $x^1\ x^2$ and point $x^4$. $x^5$ represents a single opening in the point $x^4$, and $x^6$ a series of openings at the curvature $x^2$. G represents the sheath or shovel-standard, made of a suitable length, of iron, united at its ends to form a double standard with parallel sides, as shown. This sheath, when in place, holds the beam between its sides, and is strongly secured thereto by the bolt $h$, which is placed in the proper hole in the sheath, and also in any one of the series of holes $x^6$, according as it may be desired to run the shovel at a greater or less depth. $i$ represents the break-pin of wood, which is placed in the proper hole of the sheath, and the corresponding hole $x^5$ of the beam, as shown. H represents the handles of any approved construction; and I, a hook adapted in size and position to be caught over the side rods of the arch $b'$, for the purpose of suspending the plows, the side rods being made straight at this point instead of curved, for the purpose of enabling this attachment to be readily made.

The manner of adjusting the axles for the purpose of inclining the shovel-standards to cause the shovels to run to or from the corn is as follows: If the axle is horizontal, and it is desired to incline the top of the shovel-standard outward, the nuts securing the ends of the rods D D are unscrewed, and, the end of the axle at $x$ being held, the wheel is depressed sufficiently to obtain the desired incline, and the nuts again screwed up to place, this adjustment of parts being permitted by the conical holes in the casting, as indicated in Fig. 5 of the drawing. If it is desired to incline the standard in the opposite direction the reverse of this operation takes place.

The adjustment of the beams laterally upon the axle is accomplished by loosening the set-screw $x^7$, Fig. 6, and moving them either way, as may be desired.

Having now fully described my invention, what I claim as new, and desire to secure by Letters Patent, is—

1. The combination of the hinged axles and rods D D with the blocks E, as described.

2. The combination of an axle, hinged at its inner end to a fixed support, with a supporting-socket at its outer end, adapted to permit vertical adjustment, substantially as described.

This specification signed and witnessed this 15th day of June, 1875.

WM. P. STALCUP.

Witnesses:
JNO. D. PATTEN,
THOS. BEADLE.